United States Patent
Chai et al.

(10) Patent No.: US 12,471,778 B1
(45) Date of Patent: Nov. 18, 2025

(54) OPTICAL PUMPING-BASED MULTIMODAL FUSION DETECTION APPARATUS

(71) Applicant: Westlake University, Hangzhou (CN)

(72) Inventors: Chengpeng Chai, Hangzhou (CN); Xi Yang, Hangzhou (CN); Yun-Hsuan Chen, Hangzhou (CN); Mohamad Sawan, Hangzhou (CN)

(73) Assignee: WESTLAKE UNIVERSITY, Hangzhou (CN)

( * ) Notice: Subject to any disclaimer, the term of this patent is extended or adjusted under 35 U.S.C. 154(b) by 0 days.

(21) Appl. No.: 19/181,354

(22) Filed: Apr. 17, 2025

(30) Foreign Application Priority Data

Sep. 6, 2024 (CN) .......................... 202411249231.6

(51) Int. Cl.
*A61B 5/00* (2006.01)
*A61B 5/145* (2006.01)
*A61B 5/246* (2021.01)

(52) U.S. Cl.
CPC .......... *A61B 5/0035* (2013.01); *A61B 5/0042* (2013.01); *A61B 5/0095* (2013.01);
(Continued)

(58) Field of Classification Search
CPC ..... A61B 5/0095; A61B 5/0035; A61B 5/246; A61B 5/245; A61B 5/0042; A61B 5/14542; A61B 2562/0223
See application file for complete search history.

(56) References Cited

U.S. PATENT DOCUMENTS

2006/0204197 A1* 9/2006 Miyadera ............. G02B 6/1342
  385/129
2014/0148657 A1* 5/2014 Hendler ............... A61B 5/0095
  600/545
(Continued)

FOREIGN PATENT DOCUMENTS

CN 114652265 A 6/2022
WO 0206813 A2 1/2002
(Continued)

OTHER PUBLICATIONS

Chai, Chengpeng, et al. "Multimodal Fusion of Magnetoencephalography and Photoacoustic Imaging Based on Optical Pump: Trends for Wearable and Noninvasive Brain-Computer Interface." Biosensors and Bioelectronics (2025): 117321.
(Continued)

*Primary Examiner* — John D Li
(74) *Attorney, Agent, or Firm* — Andrew C. Cheng

(57) ABSTRACT

An optical pumping-based multimodal fusion detection apparatus is provided, relating to the field of brain-computer interfaces. The system includes a laser generation module, laser path control module, atomic vapor cell, photodetection module, ultrasonic detection module, and data processing module. The photodetection module, ultrasonic detection module, and data processing module function as a detection module. The detection module collects the laser intensity and polarization variation signals of the first laser after passing through the atomic vapor cell to output local magnetic field variations in the brain caused by neural discharges. It also collects ultrasonic signals corresponding to an interaction of the second pulsed laser with the measured part to output the subject's blood oxygen signal.

11 Claims, 3 Drawing Sheets

(52) U.S. Cl.
CPC .......... *A61B 5/14542* (2013.01); *A61B 5/246* (2021.01); *A61B 2562/0223* (2013.01)

(56) References Cited

U.S. PATENT DOCUMENTS

| | | | |
|---|---|---|---|
| 2016/0287211 A1 | 10/2016 | Dacosta | |
| 2018/0214119 A1* | 8/2018 | Mehrmohammadi | ... A61B 8/12 |
| 2020/0412078 A1* | 12/2020 | Ishii | .... H01S 3/08054 |
| 2021/0156794 A1* | 5/2021 | Jeong | ........ G01J 3/42 |
| 2021/0330226 A1* | 10/2021 | Yang | ..... A61B 5/0095 |
| 2021/0396652 A1 | 12/2021 | Guo | |
| 2022/0299584 A1* | 9/2022 | Ledbetter | ....... G01R 33/26 |
| 2023/0266407 A1* | 8/2023 | Knappe | ..... G01R 33/0094 |
| | | | 324/244 |
| 2024/0197227 A1* | 6/2024 | Foley | ....... A61B 5/245 |
| 2024/0268739 A1* | 8/2024 | Foley | ....... A61B 5/243 |
| 2025/0185964 A1* | 6/2025 | Hughes | ....... A61B 5/245 |

FOREIGN PATENT DOCUMENTS

| | | | |
|---|---|---|---|
| WO | 2016151479 A1 | 9/2016 | |
| WO | 2020133521 A1 | 7/2020 | |

OTHER PUBLICATIONS

Chai, Chengpeng, et al. "Enhancing photoacoustic imaging for lung diagnostics and BCI communication: simulation of cavity structures artifact generation and evaluation of noise reduction techniques." Frontiers in Bioengineering and Biotechnology 12 (2024): 1452865.

Yang X, Chai C, Zuo H, et al. Monte Carlo-based optical simulation of optical distribution in deep brain tissues using sixteen optical sources[J]. Bioengineering, 2024, 11(3): 260.

Yang X, Chai C, Chen Y H, et al. Skull Impact on Photoacoustic Imaging of Multi-Layered Brain Tissues with Embedded Blood Vessel Under Different Optical Source Types: Modeling and Simulation[J]. Bioengineering, 2025, 12 (1): 40.

Boto, Elena, et al. "Moving magnetoencephalography towards real-world applications with a wearable system." Nature 555.7698 (2018): 657-661.

Tang, Hanchuan, et al. "Injectable ultrasonic sensor for wireless monitoring of intracranial signals." Nature 630.8015 (2024): 84-90.

Aslam, Nabeel, et al. "Quantum sensors for biomedical applications." Nature Reviews Physics 5.3 (2023): 157-169.

Tierney, Tim M., et al. "Mouth magnetoencephalography: A unique perspective on the human hippocampus." NeuroImage 225 (2021): 117443.

Mardell, Lydia C., et al. "Concurrent spinal and brain imaging with optically pumped magnetometers." Journal of Neuroscience Methods 406 (2024): 110131.

Zhang, Ting, et al. "Wearable photoacoustic watch for humans." Optics Letters 49.6 (2024): 1524-1527.

\* cited by examiner

OPTICAL PUMPING-BASED MULTIMODAL FUSION DETECTION APPARATUS

TECHNICAL FIELD

The present invention relates to brain-computer interface technology, specifically to an optical pumping-based multi-modal fusion detection apparatus.

BACKGROUND

With the advancement of neuroscience research and the development of brain-computer interface (BCI) technology, the demand for non-invasive BCI sensors is increasing. These sensors not only enhance our understanding of the brain's complex mechanisms but also play a crucial role in clinical medicine, neurorehabilitation, and human-computer interaction. Non-invasive BCI sensors can be categorized into two types based on the detected biological signals: electrophysiology-dependent sensors and blood oxygen-dependent sensors.

Electrophysiology-dependent sensors primarily capture electron flow or magnetic fields generated by biochemical processes at the cellular level, which achieve high temporal resolution at the cost of low spatial resolution, making them suitable for recording rapid and transient superficial brain activity. Examples include EEG (Electroencephalography) sensors and MEG (Magnetoencephalography) sensors. Blood oxygen-dependent sensors infer brain activity by monitoring changes in cerebral oxygenation levels. These sensors offer high spatial resolution but suffer from significant signal delays, making them ideal for long-term abnormality monitoring. Examples include fNIRS (functional near-infrared spectroscopy) sensors and PAI (Photoacoustic Imaging) sensors.

Currently, OPM-MEG (Optically Pumped Magnetometer Magnetoencephalography) sensors and PAI sensors have gained significant attention. OPM-MEG technology measures magnetic fields inside or outside the head and applies mathematical modeling to generate 3D images (source localization), illustrating how local magnetic fields (LMF) change instantaneously in response to experimental stimuli or cognitive tasks. PAI technology employs short-pulse laser excitation of tissues and detects ultrasound signals generated by the photoacoustic effect to create images, providing both blood oxygen signals and structural/functional information.

OPM-MEG sensors are considered superior to SQUID-MEG (Superconducting Quantum Interference Device Magnetoencephalography) sensors, offering higher data quality, improved coverage uniformity, motion robustness, and reduced system complexity. Similarly, PAI sensors have the potential to surpass fNIRS sensors, as they can provide oxygenation distribution mapping while enabling deeper 3D tissue imaging.

To achieve higher temporal and spatial resolution, researchers in non-invasive BCI have adopted multi-modal sensor fusion, integrating electrophysiology-dependent sensors and blood oxygen-dependent sensors. However, this approach introduces new challenges, including increased sensor size, measurement synchronization issues, positional misalignment, and crosstalk between multi-modal sensors.

Currently, OPM-MEG and PAI sensors operate as independent devices, leading to issues in data fusion due to asynchronous measurements, positional misalignment, large device sizes, and inter-sensor cross-modal interference in multi-modal setups.

SUMMARY

In view of above, an object of the present invention is to provide an optical pumping-based multi-modal fusion detection apparatus, which can achieve spatiotemporal-synchronized multi-modal fusion detection at identical positions through hardware reuse while minimizing device size and effectively mitigating crosstalk between multi-modal sensors.

In order to achieve the above purpose, the technical scheme adopted by the embodiments of the invention is as follows:

In a first aspect, the present invention provides an optical pumping-based multimodal fusion detection apparatus, comprising: a laser generation module, a laser path control module, an atomic vapor cell, a photodetection module, an ultrasonic detection module, and a data processing module, the laser generation module includes a first laser emission port and a second pulsed laser emission port, the first laser emission port is optically aligned with a first laser entry port of the atomic vapor cell; the second pulsed laser emission port is optically aligned with a path control incident port included in the laser path control module; a detection port of the atomic vapor cell is optically aligned with a preset region; the laser path control module further includes a path control emission port optically aligned with the preset region; a laser receiving port of the photodetection module is optically aligned with a first laser exit port of the atomic vapor cell; a detection point of the ultrasonic detection module is spatially correlated with the preset region; the photodetection module and the ultrasonic detection module are electrically connected to the data processing module respectively.

It is to be understood that the multimodal fusion detection apparatus provided in the embodiments of this application delivers the following beneficial effects:

By aligning the first laser emission port with the first laser entry port of the atomic vapor cell, aligning the first laser exit port of the atomic vapor cell with the laser receiving port of the photodetection module, and aligning the detection port of the atomic vapor cell with the preset region, the pulsed laser emitted from the first laser emission port propagates through the atomic vapor cell and is subsequently detected by the photodetection module. This enables the photodetection module to detect magnetic fields based on variations in the detected signals, effectively implementing an optical pumping-based magnetoencephalography (OPM-MEG) device.

By aligning the second pulsed laser emission port with the path control incident port of the laser path control module, aligning the path control emission port with the preset region, and correlating the detection point of the ultrasonic detection module with the preset region, the pulsed laser emitted from the second pulsed laser emission port propagates through the laser path control module and irradiates the preset region. Tissue absorption of laser energy generates photoacoustic waves, thereby enabling the ultrasonic detection module to perform photoacoustic (PA) detection based on variations in the detected signals, equivalently realizing a photoacoustic sensor.

Moreover, since the detection port of the atomic vapor cell is optically aligned with the preset region and the detection point of the ultrasonic detection module is spatially correlated with the same preset region, the pulsed lasers emitted from the first and second laser emission ports concurrently perform magnetic and photoacoustic detection on an identical spatial region. This achieves hardware reuse through shared optical paths and detection geometry. Consequently, the device enables spatiotemporally synchronized multimodal fusion detection at identical positions via hardware reuse, simultaneously reducing system footprint and mitigating crosstalk between multi-modal sensors.

In a second aspect, the present invention provides an optical pumping-based multimodal fusion detection apparatus, comprising: a laser generation module configured to generate a first laser and a second pulsed laser; a laser path control module configured to direct an irradiation path of the first laser through an atomic vapor cell, and direct an irradiation path of the second pulsed laser toward a preset region; the atomic vapor cell is correlated with said preset region; and a detection module configured to, when a measured region of a subject is correlated with the preset region, acquire laser intensity and polarization variation signals corresponding to the first laser after propagating through the atomic vapor cell, acquire ultrasonic signals corresponding to an interaction between the second pulsed laser and the measured region, an determine physiological signals of the subject based on said laser intensity and polarization variation signals and said ultrasonic signals.

In a third aspect, the present invention provides an optical pumping-based multimodal fusion detection apparatus, comprising: a first laser device configured to generate a first laser; a second pulsed laser device configured to generate a second pulsed laser; a laser path control module configured to direct an irradiation path of the first laser through an atomic vapor cell, and direct an irradiation path of the second pulsed laser toward a preset region; the atomic vapor cell is correlated with the preset region; and a detection module configured to, when a measured region of a subject is correlated with the preset region, acquire laser intensity and polarization variation signals corresponding to the first laser after propagating through the atomic vapor cell, acquire ultrasonic signals corresponding to an interaction between the second pulsed laser and the measured region, and determine physiological signals of the subject based on said laser intensity and polarization variation signals and said ultrasonic signals.

In a fourth aspect, the present invention provides an optical pumping-based fusion detection apparatus, comprising: a third pulsed laser device configured to generate a third pulsed laser; a beam splitter configured to split the third pulsed laser into a first laser and a second pulsed laser; a laser path control module configured to direct an irradiation path of the first laser through an atomic vapor cell, and direct an irradiation path of the second pulsed laser toward a preset region; the atomic vapor cell is correlated with said preset region; and a detection module configured to, when a measured region of a subject is correlated with said preset region, acquire laser intensity and polarization variation signals corresponding to the first laser after propagating through the atomic vapor cell, acquire ultrasonic signals corresponding to an interaction between the second pulsed laser and the measured region, and determine physiological signals of the subject based on said laser intensity and polarization variation signals and said ultrasonic signals.

To make the aforementioned objectives, features, and advantages of the present invention more comprehensible, preferred embodiments are described in detail below with reference to the drawings.

BRIEF DESCRIPTION OF THE DRAWINGS

To more clearly illustrate the technical solutions of the embodiments of the present invention, the drawings required to describe the embodiments are briefly introduced below. It is to be understood that the following drawings illustrate only certain embodiments of the present invention and therefore should not be construed as limiting the scope. For those skilled in the art, other related drawings may be derived from these figures without inventive efforts.

REFERENCE NUMERALS

Figure 1:
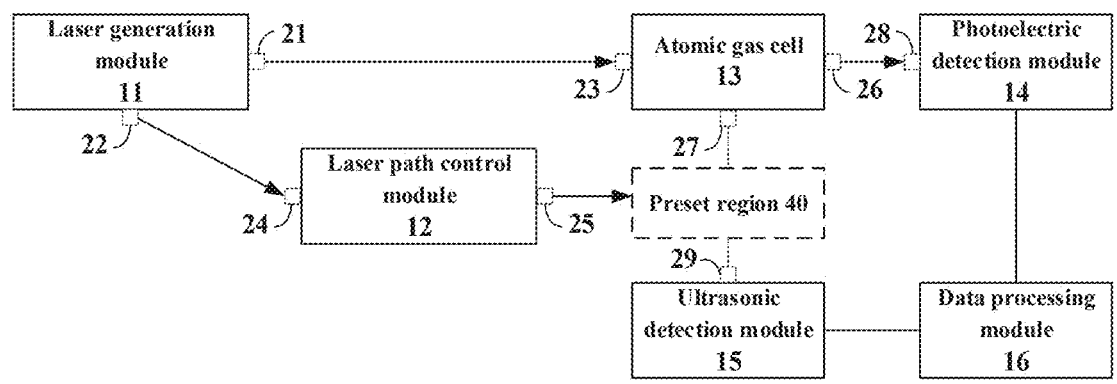
FIG. 1 is a schematic diagram of an optical pumping-based multimodal fusion detection apparatus according to an embodiment of the present invention.

11: Laser generation module; 12: Laser path control module; 13: Atomic vapor cell; 14: Photodetection module; 15: Ultrasonic detection module; 16: Data processing module; 21: First laser emission port; 22: Second pulsed laser emission port; 23: First laser entry port; 24: Path control incident port; 25: Path control emission port; 26: First laser exit port; 27: Detection port; 28: Laser receiving port; 29: Detection point; 40: Preset region;

100: Multimodal fusion detection apparatus; 110: Pulsed laser device; 111: Filter; 112: Focusing lens; 113: Beam aperture; 114: Focusing lens; 115: Beam splitter; 116: Beam splitter; 120: Refractive lens; 121: Collimating lens; 130: Atomic vapor cell; 140: Balanced photodetector; 141: Beam splitter; 142: Photodetection port; 143: Photodetection port; 150: Signal amplifier; 151: Ultrasonic transducer; 153: Reference photodetection port; 160: Data acquisition device; 170: Optical fiber coupler; 171: Optical amplifier; 172: Diffuser;

200: Multimodal fusion detection apparatus; 210: Second pulsed laser device; 211: Filter; 212: Focusing lens; 213: Beam aperture; 214: Focusing lens; 215: First laser device; 216: Filter; 217: Focusing lens; 218: Beam aperture; 219: Focusing lens; 220: Refractive lens; 230: atomic vapor cell; 240: Balanced photodetector; 241: Beam splitter; 242: Photodetection port; 243: Photodetection port; 250: Signal amplifier; 251: Ultrasonic transducer; 253: Beam splitter; 254: Reference photodetection port; 260: Data acquisition device; 270: Optical fiber coupler; 271: Optical amplifier; 272: Diffuser.

DETAILED DESCRIPTION

To clarify the objectives, technical solutions, and advantages of the embodiments of the present invention, the following description combines the drawings to provide a clear and comprehensive explanation of the technical solutions in the embodiments. Evidently, the described embodiments represent only a portion of the invention's implementations rather than exhaustive examples. Components illustrated in the drawings may be arranged and designed through various configurations. Therefore, the detailed description of the embodiments provided in the drawings is not intended to limit the claimed scope of the invention but merely illustrates selected implementations. All other embodiments obtained by those skilled in the art based on the disclosed embodiments without inventive efforts shall fall within the protection scope of the present invention.

It should be noted that identical reference numerals denote similar elements across the drawings. Once an element is defined in one figure, it requires no further definition or explanation in subsequent figures.

Additionally, it should be noted that features in the embodiments of the present invention may be combined reciprocally provided such combinations are implemented in a non-conflicting manner.

During the implementation of the embodiments of this application, the inventors identified critical challenges in prior art systems. While EEG, fNIRS, and PAI have seen extensive development, integrating multiple discrete detectors introduces significant limitations:

1. Spatial Synchronization Challenges:

In multimodal BCI applications, conventional devices like EEG and fNIRS employ wearable soft caps for data acquisition. However, inherent differences in their physical architecture and operational principles prevent sensor or measurement point sharing within a unified setup. Bulky fNIRS optical fibers, EEG cables, and electrodes compete for scalp coverage, creating mechanical integration challenges when coupling EEG electrodes with fNIRS sources/detectors on a subject's head.

2. Temporal Synchronization Challenges

Achieving sufficient temporal precision and simultaneous fNIRS-EEG recording synchronization remains problematic. Current solutions for temporal alignment include timestamp synchronization, centralized synchronization control systems and partial hardware reuse. While timestamp alignment ensures temporal matching of multi-device data, and centralized systems trigger simultaneous measurements via unified mechanisms, hardware sharing can include ADC and light source reuse, these approaches still fail to meet stringent synchronization requirements.

3. Crosstalk Challenges Between Devices

Custom EEG sensors using Ag/AgCl powder-sintered cylindrical silver-coated copper wires are required to limit residual magnetic fields below 50 pT, preventing OPM power spectral density fluctuations. Additionally, frequency multiplexing in high-channel-count light source systems must avoid electrical crosstalk with EEG. Nevertheless, existing methods still lead to unacceptable crosstalk between multimodal sensors.

In view of some or all of the aforementioned challenges, the embodiments of this invention provide multiple optical pumping-based multimodal fusion detection apparatuses spanning technical domains including BCI, quantum mechanics, neuroscience, optics, and acoustics. These apparatuses enable implementation of non-invasive wearable BCI devices, achieve spatiotemporally coherent multimodal fusion detection through hardware reuse, and simultaneously reduce device footprint and minimize crosstalk between multimodal sensors. The following description elaborates the technical solutions with reference to the drawings.

First, an optical pumping-based multimodal fusion detection apparatus according to an embodiment of the present invention is described. Referring to FIG. 1, the schematic structural diagram illustrates the device comprising:

a laser generation module 11, a laser path control module 12, an atomic vapor cell 13, a photodetection module 14, an ultrasonic detection module 15 and a data processing module 16.

The laser generation module 11 is configured to generate laser beams. The laser path control module 12 directs laser propagation paths to achieve optical path modulation. The atomic vapor cell 13 operates based on optical pumping magnetometer principles, comprising, for example, a sealed chamber containing gaseous species such as 87Rb or 4He.

Depending on application requirements, the atomic vapor cell 13 may additionally include a heating module, a modulated magnetic field generation module, or other auxiliary components, with no limitations imposed herein.

The laser generation module 11 may further incorporate optical components such as filters and/or polarizers for laser propagation path conditioning. The photodetection module 14 converts optical signals into electrical signals to detect laser intensity variations. In coordination with the atomic vapor cell 13 and data processing module 16, the photodetection module 14 enables physiological signal detection via optical pumping magnetometry using pulsed lasers generated by laser generation module 11.

The ultrasonic detection module 15 is configured to acquire photoacoustic wave signals and cooperates with the data processing module 16 to perform blood oxygenation detection through photoacoustic imaging, based on pulsed lasers generated from the laser generation module 11.

The data processing module 16 is configured to process input data according to predefined algorithmic routines to achieve target arithmetic objectives, and output algorithmically derived results based on the implemented computations.

The laser generation module 11 comprises the first laser emission port 21 and a second pulsed laser emission port 22. The laser path control module 12 includes a path control incident port 24 and a path control emission port 25. The atomic vapor cell 13 includes a first laser entry port 23, a first laser exit port 26, and a detection port 27. The photodetection module 14 includes a laser receiving port 28. the ultrasonic detection module 15 includes a detection point 29. The photodetection module 14 and the ultrasonic detection module 15 are electrically connected to the data processing module 16 respectively.

Referring to FIG. 1, the first laser emission port 21 is optically aligned with the first laser entry port 23. The second pulsed laser emission port 22 is optically aligned with the path control incident port 24. The path control emission port 25 and the detection port 27 are both optically aligned with the preset region 40. The laser receiving port 28 is optically aligned with the first laser exit port 26. The detection point 29 is spatially correlated with the preset region 40.

For the embodiments, the following clarifications are applied:

First of all, the term "alignment" in the embodiments may refer to either linear alignment between components A and B, or indirect alignment via optical components. For example, the "alignment" can be interpreted as follows: a laser beam emitted from point A directly aligns with point B, alternatively, a laser beam emitted from point A is redirected by optical elements to align with point B.

Secondly, the alignment configurations illustrated in FIG. 1 are non-limiting examples. The alignment between laser ports/modules may adopt either direct or indirect methods. For instance, alignment between a laser emission port and a receiving port may involve free-space propagation or guided optical paths.

Thirdly, the "correlation" between detection point 29 and preset region 40 implies that the detection point 29 is positioned adjacent to, surrounding, or interposed within the preset region 40, enabling the ultrasonic detection module 15 to monitor the preset region 40.

In some optional embodiments, within the laser path control module 12, the laser enters through the path control incident port 24 and exits from the path control emission port 25. Within the atomic vapor cell 13, the laser enters through the first laser entry port 23 and exits from the first laser exit port 26.

In other words, the laser generation module 11 is capable of generating a first laser and a second pulsed laser.

The laser propagation sequences of the first laser may include:

First laser emission port 21→first laser entry port 23→atomic vapor cell 13→first laser exit port 26→Laser receiving port 28.

The laser propagation sequences of the second pulsed laser may include:

Second pulsed laser emission port 22→Path control incident port 24→Laser path control module 12→Path control emission port 25→Preset region 40.

For the multimodal fusion detection apparatus shown in FIG. 1, in some embodiments, the laser generation module 11 is configured to generate a first laser and a second pulsed laser. The laser path control module 12 is configured to: direct the irradiation path of the first laser through the atomic vapor cell 13 and direct the irradiation path of the second pulsed laser toward the preset region 40. The atomic vapor cell 13 is spatially correlated with the preset region 40, which means the atomic vapor cell 13 is configured to detect the preset region.

Furthermore, the photodetection module 14, ultrasonic detection module 15, and data processing module 16 collectively function as a detection module. When a measured region of a subject is correlated with the preset region 40, the detection module is configured to: acquire laser intensity and polarization variation signals corresponding to the first laser after propagating through the atomic vapor cell 13 and acquire ultrasonic signals corresponding to an interaction between the second pulsed laser and the measured region. Subsequently, the detection module determines physiological signals of the subject based on the laser intensity/polarization variation signals and ultrasonic signals. Specifically, the detection module outputs physiological signals (interpreted as localized magnetic field variations in the subject's brain caused by neuronal discharges) derived from the laser intensity and polarization variation signals, and outputs blood oxygenation signals of the subject derived from the ultrasonic signals.

The detection module may be implemented using magnetic field modulation and phase-locked detection techniques. For specific technical details, please refer to the relevant technical literature, which will not be elaborated here.

The preset region 40 is the setting position of the measured part of the subject. The association between the measured part and the preset region 40 is defined as the measured part of the subject is set in the preset region.

It is to be understood that the first laser emission port 21 is optically aligned with the first laser entry port 23 of the atomic vapor cell 13. The first laser exit port 26 of the atomic vapor cell 13 is optically aligned with the laser receiving port 28 of the photodetection module 14, and the detection port 27 of the atomic vapor cell 13 is aligned with the preset region 40. This configuration ensures that the pulsed laser emitted from the first laser emission port 21 propagates through the atomic vapor cell 13 and is detected by the photodetection module 14, enabling OPM-MEG detection based on laser intensity and polarization variations, thus functionally implementing an optical pumping-based magnetoencephalography system. Since the second pulsed laser emission port 22 is optically aligned with the path control incident port 24, the path control emission port 25 is aligned with the preset region 40, the detection point 29 of the ultrasonic detection module 15 is correlated with the preset region 40, this configuration ensures that the pulsed laser emitted from the second pulsed laser emission port 22 propagates through the laser path control module 12 and irradiates the preset region 40, enabling photoacoustic detection by the ultrasonic detection module 15 based on photoacoustic signal variations. This functionally implements a photoacoustic sensor. Furthermore, since the detection port 27 of the atomic vapor cell 13 is aligned with the preset region 40, the detection point 29 of the ultrasonic detection module 15 is correlated with the same preset region 40, the pulsed lasers emitted from the first laser emission port 21 and second pulsed laser emission port 22 concurrently perform magnetic field detection and photoacoustic detection on the identical spatial region. This configuration achieves hardware reuse by sharing the optical alignment geometry and detection focal area. Consequently, through this hardware reuse strategy, the device enables spatiotemporal-synchronized multi-modal fusion detection at identical positions through this hardware reuse strategy, while simultaneously reducing system footprint and mitigating cross-modal interference between multi-modal sensors.

Optionally, the laser emitted from the path control emission port 25 may partially overlap with the detection path of the atomic vapor cell 13 (not shown in FIG. 1). This configuration enhances hardware reuse efficiency, as detailed in embodiments illustrated in FIGS. 2 and 3. Notably, at least one of the signal amplifiers (AMP) and data acquisition device (DAQ) may be shared across modalities based on application requirements, with implementation specifics determined by technical personnel, which is omitted herein.

The balanced photodetector in this application may incorporate partial attachment of dual-channel signal amplifiers (AMP).

The detection path of the atomic vapor cell 13 may comprise the optical path from the detection port 27 to the preset region 40.

In certain optional embodiments, the laser generation module 11 may be implemented using a single laser device. Pulsed laser beams generated by this laser device are split via a beam splitter to obtain: a first laser (interpretable as a first pulsed laser in this context), and a second pulsed laser. The first laser satisfies relaxation requirements of the optical pumping magnetometer principle during propagation through the atomic vapor cell, while the second pulsed laser meets photoacoustic pressure requirements for optoacoustic imaging. For implementation details of this embodiment, refer to the description of the multimodal fusion detection apparatus 100 illustrated in FIG. 2.

Figure 2:
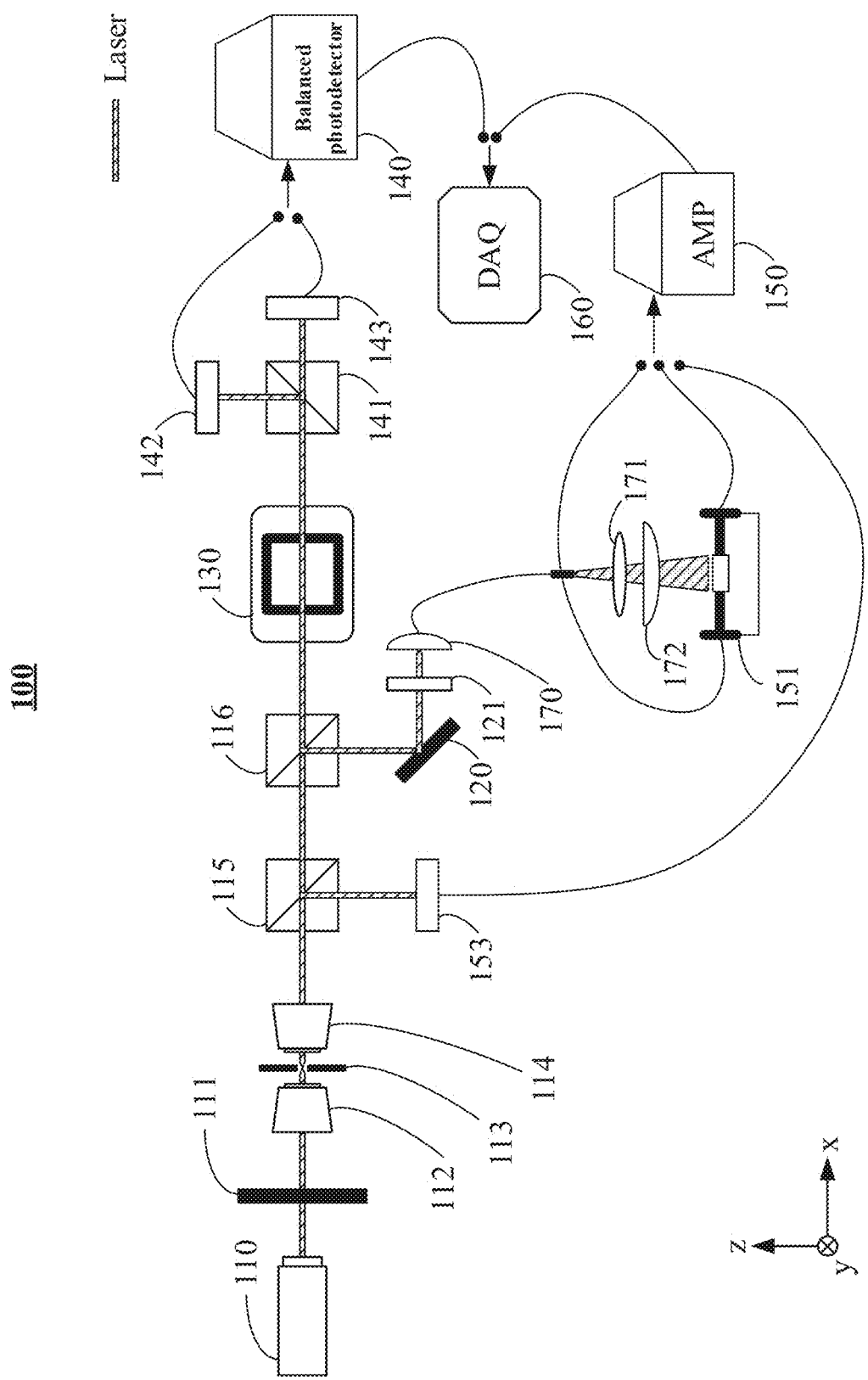
FIG. 2 is another schematic diagram of the optical pumping-based multimodal fusion detection apparatus according to an embodiment of the present invention.

Please refer to FIG. 2, which schematically illustrates another structural configuration of the optical pumping-based multimodal fusion detection apparatus according to an embodiment of the present invention. The detailed description is as follows:

The multimodal fusion detection apparatus 100 may include: pulsed laser device 110, filter 111, focusing lens 112, beam aperture 113, focusing lens 114, beam splitter 115, beam splitter 116, refractive lens 120, collimating lens 121, atomic vapor cell 130, balanced photodetector 140, beam splitter 141, photodetection port 142, photodetection port 143, signal amplifier 150, ultrasonic transducer 151 (e.g., single-element or array configurations), reference photodetection port 153, data acquisition (DAQ) device 160, optical fiber coupler 170, optical amplifier 171, and diffuser 172. The ultrasonic transducer 151 may adopt various configurations, including but not limited to single-element transducers or transducer arrays.

It is understood that the multimodal fusion detection apparatus 100 may incorporate additional or fewer components than those illustrated in FIG. 2, depending on actual detection requirements. Specific implementations may be flexibly configured by those skilled in the art, with no limitation imposed herein.

For the multimodal fusion detection apparatus 100 shown in FIG. 2, the positional and connective relationships among components shall be interpreted according to the illustrated configuration, with detailed descriptions omitted herein. The operational principles are elaborated through laser propagation paths as follows:

Laser Propagation Paths in FIG. 2:

The pulsed laser device 110 generates a laser beam that sequentially passes through filter 111, focusing lens 112, beam aperture 113, and focusing lens 114 before reaching beam splitter 115. Beam splitter 115 divides the incoming laser beam into two beams: a primary laser beam propagates to beam splitter 116 and a secondary laser beam propagates to reference photodetection port 153. Beam splitter 116 further splits the primary laser beam into a first primary sub-beam and a second primary sub-beam. The first primary sub-beam propagates through the atomic vapor cell 130 and is incident on beam splitter 141, which splits it into two measurement beams. These beams are respectively received by photodetection port 142 and photodetection port 143, both connected to the balanced photodetector 140. According to OPM-MEG principles, the laser intensity and polarization of the first primary sub-beam are modulated by physiological signals (e.g., magnetic field variations induced by neural activity) in the measured region of the subject. Photodetection ports 142 and 143 acquire these modulated signals and transmit them to the balanced photodetector 140 and data acquisition device 160 for processing. The second primary sub-beam is redirected by refractive lens 120, collimated by collimating lens 121, and coupled into the optical fiber coupler 170. The beam is then amplified by optical amplifier 171, homogenized through diffuser 172, and irradiates the preset region 40. Interactions between the second primary sub-beam and the subject's measured region generate ultrasonic signals, which are captured by the ultrasonic transducer 151, amplified by signal amplifier 150, and transmitted to the data acquisition device 160.

During the aforementioned process, the data acquisition device 160 respectively collects both the laser intensity and polarization variation signals corresponding to the laser after passing through the atomic vapor cell 130, as well as the ultrasonic signals corresponding to an interaction between the laser and the measured part of the subject. Based on the OPM-MEG principle, the data acquisition device 160 outputs physiological signals of the subject using the laser intensity and polarization variation signals, thereby implementing an optical pumping-based magnetoencephalography system. Additionally, based on the PAI (Photoacoustic Imaging) principle, the data acquisition device 160 outputs blood oxygen signals of the subject using the ultrasonic signals, functioning as a photoacoustic sensor.

In the multimodal fusion detection apparatus 100 shown in FIG. 2, the module comprising the pulsed laser device 110 (may referred to as the third pulsed laser) and the beam splitter 116 implements the laser generation module 11 described in the embodiment of FIG. 1. The emission position of the first primary sub-beam split from the beam splitter 116 corresponds to the first laser emission port 21 in FIG. 1, while the emission position of the second primary sub-beam split from the beam splitter 116 corresponds to the second pulsed laser emission port 22 in FIG. 1. The refractive lens 120 and collimating lens 121 collectively implement the laser path control module 12 in FIG. 1. The incident position of the second primary sub-beam at the refractive lens 120 corresponds to the path control incident port 24 in FIG. 1, and the emission position of the second primary sub-beam at the collimating lens 121 corresponds to the path control emission port 25 in FIG. 1. The photodetection ports 142, 143 and the balanced photoelectric detector 140 implement the photodetection module 14 in the FIG. 1 embodiment. The ultrasonic transducer 151 and signal amplifier 150 implement the ultrasonic detection module 15 in the FIG. 1 embodiment. Additional or fewer correspondences between FIG. 1 and FIG. 2 embodiments are not exhaustively described herein, and specific correspondences may be configured based on practical requirements.

According to the correspondence between the embodiment shown in FIG. 2 and the embodiment shown in FIG. 1, in some optional embodiments, the multimodal fusion detection apparatus in FIG. 1 may include a third pulsed laser and a beam splitter as part of the laser generation module 11. The third pulsed laser is configured to generate a third pulsed laser, and the beam splitter is configured to split the third pulsed laser into a first laser and a second pulsed laser. Optionally, the first laser is emitted through the first laser emission port 21 of the beam splitter, and the second pulsed laser is emitted through the second pulsed laser emission port 22 of the beam splitter.

The laser path control module 12 is configured to direct the irradiation path of the first laser through the atomic vapor cell 13 and direct the irradiation path of the second pulsed laser toward the preset region 40, where the atomic vapor cell 13 may be configured to be associated with the preset region 40. Moreover, the photodetection module 14, ultrasonic detection module 15, and data processing module 16 collectively function as a detection module. When the measured part of the subject is associated with the preset region 40, the detection module is configured to collect laser intensity and polarization variation signals corresponding to the first laser after propagation through the atomic vapor cell 13 and collect ultrasonic signals corresponding to an interaction between the second pulsed laser and the measured part. Subsequently, the detection module determines physiological signals of the subject based on the laser intensity, polarization variation signals and the ultrasonic signals.

In some optional embodiments, the laser generation module 11 may be implemented using two laser devices, which respectively generate the first laser and the second pulsed laser. Specifically, the laser generation module 11 may include a detection laser and an optical pumping laser, where the detection laser serves as the light source for OPM-MEG, and the optical pumping laser serves as the light source for PAI. For this embodiment, refer to the description of the multimodal fusion detection apparatus 200 illustrated in FIG. 3

Figure 3:
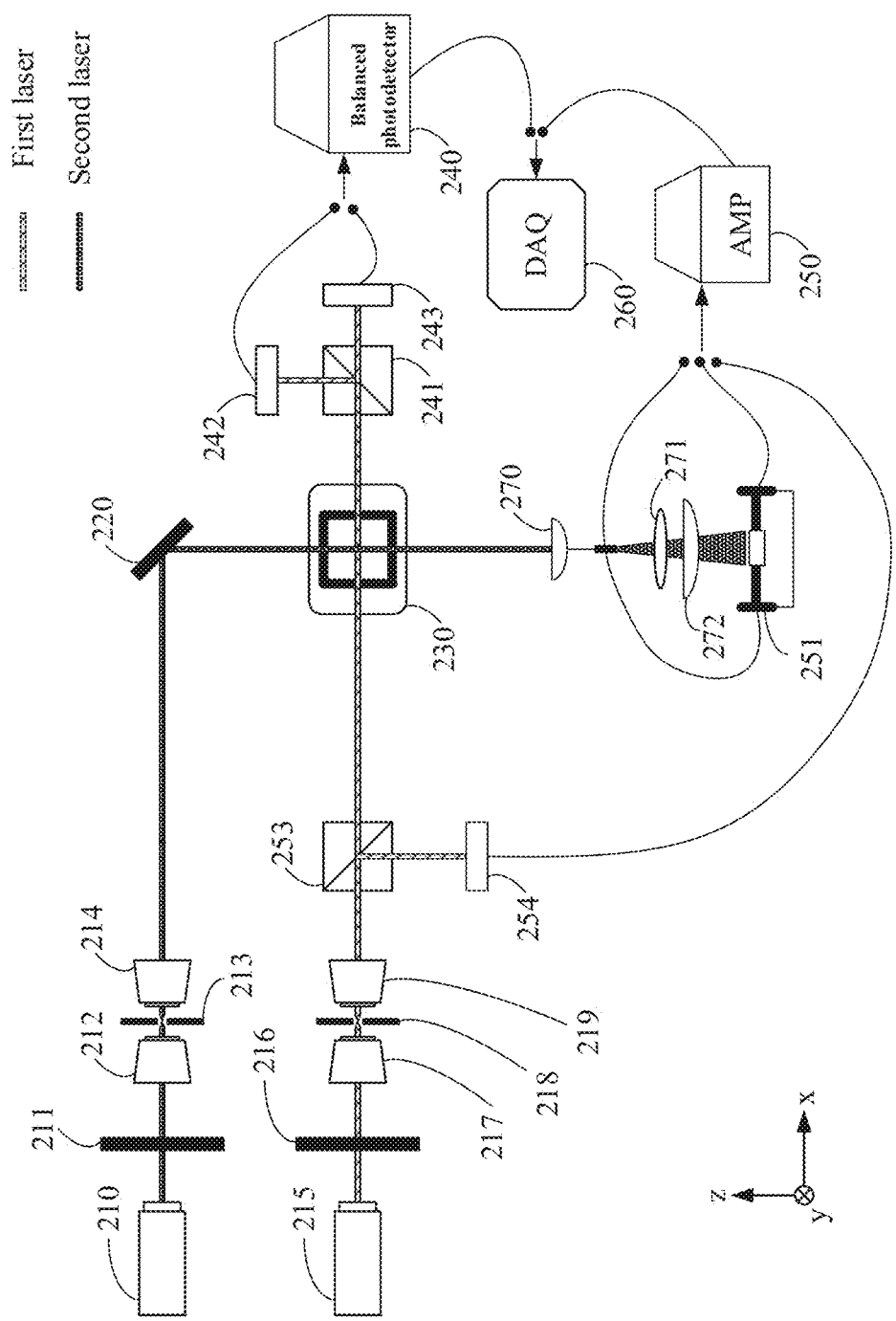
FIG. 3 is yet another schematic diagram of the optical pumping-based multimodal fusion detection apparatus according to an embodiment of the present invention.

Refer to FIG. 3, which illustrates another structural configuration of the optical pumping-based multimodal fusion detection apparatus according to an embodiment of the present invention. The detailed description is as follows:

The multimodal fusion detection apparatus 200 comprises, but is not limited to: a first laser device 215, a filter 211, a focusing lens 212, a beam aperture 213, a focusing lens 214, a second pulsed laser device 210, a filter 216, a focusing lens 217, a beam aperture 218, a focusing lens 219, a refractive lens 220, an atomic vapor cell 230, a balanced photodetector 240, a beam splitter 241, a photodetection port 242, a photodetection port 243, a signal amplifier 250, an ultrasonic transducer 251, a beam splitter 253, a reference photodetection port 254, a data acquisition (DAQ) device 260, an optical fiber coupler 270, an optical amplifier 271, and a diffuser 272.

It is understood that, depending on practical detection requirements, the multimodal fusion detection apparatus 200 may further include additional components not illustrated in FIG. 3 or may omit certain components. Such configurations can be flexibly implemented by those skilled in the art, and no specific limitations are imposed herein.

For the multimodal fusion detection apparatus 200 shown in FIG. 3, the positional and connectivity relationships between devices and components shall be interpreted in accordance with FIG. 3, and no further detailed description is provided herein. The following describes the embodiment based on the propagation paths of the pulsed lasers:

For the first laser propagation path: the first laser device 215 generates a first laser, which sequentially passes through the filter 216, focusing lens 217, beam aperture 218, and focusing lens 219, and is then directed toward the beam splitter 253. The beam splitter 253 splits the first laser into two beams: first laser I and first laser II, wherein the first laser I is aligned with the atomic vapor cell 230. After passing through the atomic vapor cell 230, it is directed toward the beam splitter 241, which further splits the first laser I into two sub-beams. These sub-beams are respectively directed to the photodetection port 242 and photodetection port 243, both connected to the balanced photodetector (BPD) 240. According to the OPM-MEG principle, the laser intensity of the first laser I after propagating through the atomic vapor cell 230 varies in response to physiological signal changes in the measured part of the subject. The photodetection ports 242 and 243 collect the laser intensity and polarization variation signals corresponding to the first laser I and transmit these signals to the balanced photodetector 240 and the data acquisition device 260. The first laser II is optically aligned with the reference photodetection port 254, and the photodetection port 254 is configured to transmit the detected optical signal from the first laser II to the signal amplifier 250 and the data acquisition device 260 for subsequent processing.

For the second pulsed laser propagation path: the second pulsed laser device 210 generates a second laser, which sequentially passes through the filter 211, focusing lens 212, beam aperture 213, and focusing lens 214, and is then directed toward the refractive lens 220. After refraction by the refractive lens 220, the second laser is aligned with the atomic vapor cell 230. Subsequently, the second laser propagates through the atomic vapor cell 230 and enters the optical fiber coupler 270. Upon reception by the optical fiber coupler 270, the second laser is guided to the optical amplifier 271 and diffuser 272. After processing by the optical amplifier 271 and diffuser 272, the second laser illuminates the preset region. Within the preset region, the second pulsed laser interacts with the measured part of the subject, generating corresponding ultrasonic signals via the photoacoustic effect. These ultrasonic signals are captured by the ultrasonic transducer 251, then transmitted to the signal amplifier 250 and the data acquisition device 260 for subsequent processing.

During the aforementioned process, the data acquisition device 260 respectively collects the laser intensity and polarization variation signals corresponding to the first laser after propagation through the atomic vapor cell 230, and the ultrasonic signals corresponding to an interaction between the second laser and the measured part of the subject. Based on the OPM-MEG principle, the data acquisition device 260 outputs physiological signals of the subject using the laser intensity and polarization variation signals, thereby implementing an optical pumping-based magnetoencephalography system; based on the PAI principle, the data acquisition device 260 outputs blood oxygen signals of the subject using the ultrasonic signals, thereby functioning as a photoacoustic sensor.

In some optional embodiments, the first laser device 215 is a detection laser, and the second pulsed laser device 210 is an optical pumping laser. The detection laser may operate as either a continuous-wave (CW) laser or a pulsed laser device, depending on the application requirements. The wavelength of the laser generated by the detection laser may be set to 795 nm, while the wavelength of the pulsed laser generated by the optical pumping laser may be set to 780 nm, ensuring optimal alignment with the optical pumping magnetometer and photoacoustic imaging principles, respectively.

For the multimodal fusion detection apparatus 200 shown in FIG. 3, the first laser device 215 and second pulsed laser device 210 collectively implement the laser generation module 11 described in FIG. 1 embodiment. The first laser I corresponds to the first laser in the embodiment in FIG. 1, where the emission position of first laser I from the beam splitter 253 corresponds to the first laser emission port 21 in FIG. 1, and the emission position of the second laser from the focusing lens 214 corresponds to the second pulsed laser emission port 22 in FIG. 1. The refractive lens 220 implements the laser path control module 12 in FIG. 1, where the incident position of the second laser at the refractive lens 220 corresponds to the path control incident port 24 in FIG. 1, and the emission position of the second laser at the refractive lens 220 corresponds to the path control emission port 25 in FIG. 1. The photodetection ports 242, 243 and balanced photodetector 240 implement the photodetection module 14 in the FIG. 1 embodiment. The ultrasonic transducer 251 and signal amplifier 250 implement the ultrasonic detection module 15 in the FIG. 1 embodiment. Additional or fewer correspondences between FIG. 1 and FIG. 3 embodiments are not exhaustively described herein, and specific mappings can be configured based on practical requirements.

In some optional embodiments, for FIG. 1 and FIG. 3, the atomic vapor cell may be disposed between the path control emission port and the preset region, such that the laser emitted from the path control emission port propagates through the atomic vapor cell before irradiating the preset region (this configuration is not explicitly shown in FIG. 1). In other words, the irradiation path of the second pulsed laser is further configured to pass through the atomic vapor cell and then be directed toward the preset region. This design significantly enhances hardware reuse between the two detection technologies (OPM-MEG and PAI) and reduces the device footprint.

According to the correspondence between the embodiments shown in FIG. 3 and FIG. 1, in some optional embodiments, the multimodal fusion detection apparatus of FIG. 1 may include a first laser device and a second pulsed laser device as part of the laser generation module 11. The first laser device comprises the first laser emission port 21, and the second pulsed laser device comprises the second pulsed laser emission port 22. The first laser device is configured to generate a first laser, while the second pulsed laser device is configured to generate a second pulsed laser.

The laser path control module 12 is configured to direct the irradiation path of the first laser through the atomic vapor cell 13 and direct the irradiation path of the second pulsed laser toward the preset region 40. The atomic vapor cell 13 is associated with the preset region 40. The photodetection module 14, ultrasonic detection module 15, and data processing module 16 collectively function as a detection module. When the measured part of the subject is associated with the preset region 40, the detection module collects laser intensity and polarization variation signals of the first laser after propagation through the atomic vapor cell 13, and collects ultrasonic signals corresponding to an interaction between the second pulsed laser and the measured part. Subsequently, the detection module determines physiological signals of the subject based on the laser intensity/polarization variation signals and ultrasonic signals.

Based on the embodiments illustrated in FIG. 1 to FIG. 3, in some optional embodiments, the laser path control module 12 may include refractor or a combination of refractor and a collimating lens. In further optional embodiments, the laser path control module 12 may additionally include filters or polarizers to achieve control of the laser path.

Based on the embodiments illustrated in FIG. 1 to FIG. 3, in some optional embodiments, the multimodal fusion detection apparatus may incorporate an optical fiber guidance module. The laser emitted from the path control emission port 25 is optically aligned with the preset region 40 via this optical fiber guidance module. The optical fiber guidance module may comprise an optical fiber coupler, an optical amplifier, and a diffuser, such as the optical fiber coupler 170, optical amplifier 171, and diffuser 172 shown in FIG. 2.

Based on the embodiments illustrated in FIG. 1 to FIG. 3, in some optional embodiments, the first laser satisfies the relaxation requirements of the optical pumping magnetometer (OPM-MEG) principle when propagating through the atomic vapor cell 13, while the second pulsed laser meets the photoacoustic pressure requirements for photoacoustic imaging (PAI).

The first laser, during its propagation through the atomic vapor cell 13, satisfies the relaxation requirements of the OPM-MEG principle. For example, one or more parameters of the first laser—such as intensity, frequency, or wavelength—are designed to align with the relaxation parameter criteria for OPM-MEG. Specifically, a complete relaxation process is achieved within a single laser pulse to efficiently energize the OPM. These parameters may be configured based on practical design requirements and OPM-MEG principles, and no specific limitations or exhaustive specifications are provided herein.

The second pulsed laser meets the photoacoustic pressure requirements for PAI. For example, one or more parameters of the second pulsed laser—such as intensity, frequency, or wavelength—are designed to align with the PAI criteria. Specifically, when the laser emitted from the path control emission port 25 is optically aligned with the preset region 40 via the optical fiber guidance module, it generates a PAI initial acoustic pressure sufficient for detection by the ultrasonic transducer. These parameters may be configured based on practical design requirements and PAI principles, and no exhaustive specifications are imposed herein.

The foregoing descriptions are merely exemplary embodiments of the present invention and are not intended to limit the scope of protection thereof. For those skilled in the art, the present invention may be subject to various modifications and variations. Any modifications, equivalent replacements, or improvements made within the spirit and principles of the present invention shall fall within the scope of protection of the present invention.

What is claimed is:

1. An optical pumping-based multimodal fusion detection apparatus, comprising:
   a laser generation module, a laser path control module, an atomic vapor cell, a photodetection module, an ultrasonic detection module, and a data processing module;
   wherein the laser generation module comprises a first laser emission port and a second pulsed laser emission port, the first laser emission port is optically aligned with a first laser entry port of the atomic vapor cell, the second pulsed laser emission port is optically aligned with a path control incident port comprised in the laser path control module, a detection port of the atomic vapor cell is optically aligned with a preset region, and the atomic vapor cell is a gas cell based on an optical pumping magnetometer principle, the atomic vapor cell is configured to detect the preset region, the preset region corresponds to a set position of a measured part of a subject;
   the laser path control module further comprises a path control emission port, the path control emission port is optically aligned with the preset region;
   a laser receiving port of the photodetection module is optically aligned with a first laser exit port of the atomic vapor cell;
   a detection point of the ultrasonic detection module is associated with the preset region and is used to enable the ultrasonic detection module to detect the preset region;
   the photodetection module and the ultrasonic detection module are respectively electrically connected to the data processing module, and the photodetection module, ultrasonic detection module, and data processing module collectively function as a detection module;
   wherein the detection module is configured to collect a laser intensity and polarization variation signals corresponding to the first laser after propagation through the atomic vapor cell and output local magnetic field variations in a brain of the subject caused by neural discharges based on the laser intensity and polarization variation signals, the detection module is further configured to collect ultrasonic signals corresponding to an interaction between the second pulsed laser and the measured part, and output blood oxygen signals of the subject based on the ultrasonic signals; and
   the data processing module is implemented by a data acquisition device, the laser generation module is implemented using a third pulsed laser device, and a pulsed laser generated by the third pulsed laser device propagates through a beam splitter to respectively produce the first laser and the second pulsed laser.

2. The optical pumping-based multimodal fusion detection apparatus according to claim 1, wherein the laser emitted from the path control emission port at least partially overlaps with a detection path of the atomic vapor cell.

3. The optical pumping-based multimodal fusion detection apparatus according to claim 2, wherein the detection path of the atomic vapor cell includes a path from the detection port to the preset region.

4. The optical pumping-based multimodal fusion detection apparatus according to claim 1, further comprising an optical fiber guidance module; wherein the laser emitted from the path control emission port is optically aligned with the preset region via the optical fiber guidance module.

5. The optical pumping-based multimodal fusion detection apparatus according to claim 4, wherein the optical fiber guidance module comprises an optical fiber coupler, an amplifier, and a diffuser.

6. An optical pumping-based multimodal fusion detection apparatus, comprising:
- a laser generation module, configured to generate a first laser and a second pulsed laser;
- a laser path control module, configured to direct an irradiation path of the first laser through an atomic vapor cell and to direct an irradiation path of the second pulsed laser toward a preset region;
- wherein the atomic vapor cell is associated with the preset region, the atomic vapor cell being a gas cell based on an optical pumping magnetometer principle and configured to detect the preset region, the preset region is a set position of a measured part of a subject;
- a detection module, configured to, when the measured part of the subject is associated with the preset region, collect a laser intensity and polarization variation signals corresponding to the first laser after propagation through the atomic vapor cell, and collect ultrasonic signals corresponding to an interaction between the second pulsed laser and the measured part;
- wherein the detection module is further configured to output local magnetic field variations in a brain of the subject caused by neural discharges based on the laser intensity and polarization variation signals, and to output blood oxygen signals of the subject based on the ultrasonic signals; and the laser generation module comprises a third pulsed laser device and a beam splitter, the third pulsed laser device is configured to generate a third pulsed laser, and the beam splitter is configured to split the third pulsed laser into the first laser and the second pulsed laser.

7. The optical pumping-based multimodal fusion detection apparatus according to claim 6, wherein the first laser satisfies relaxation conditions of an optical pumping magnetometer principle during propagation through the atomic vapor cell, and the second pulsed laser satisfies photoacoustic pressure requirements for optoacoustic imaging.

8. The optical pumping-based multimodal fusion detection apparatus according to claim 7, wherein one or more parameters of intensity, frequency, and wavelength of the first laser satisfy relaxation parameter design requirements for optical pumping magnetometer magnetoencephalography.

9. The optical pumping-based multimodal fusion detection apparatus according to claim 7, wherein one or more parameters of the intensity, frequency, and wavelength of the second pulsed laser satisfy design requirements for photoacoustic imaging.

10. The optical pumping-based multimodal fusion detection apparatus according to claim 6, wherein the measured part of the subject being associated with the preset region is defined as the measured part of the subject being disposed within the preset region.

11. The optical pumping-based multimodal fusion detection apparatus according to claim 6, wherein the laser path control module comprises a refractor.

* * * * *